United States Patent

[11] 3,589,337

| [72] | Inventor | Thomas H. Doss<br>P.O. Box 10839, Houston, Tex. 77018 |
| --- | --- | --- |
| [21] | Appl. No. | 864,073 |
| [22] | Filed | Oct. 6, 1969 |
| [45] | Patented | June 29, 1971 |

[54] RADIO CONTROLLED ANIMAL TRAINING DEVICE
5 Claims, 3 Drawing Figs.

[52] U.S. Cl. ............................................ 119/29, 119/106, 331/112, 231/2
[51] Int. Cl. ........................................................ A01k 15/00
[50] Field of Search ........................................... 119/29, 106; 331/112; 231/2; 325/66, 118

[56] References Cited
UNITED STATES PATENTS

| 2,023,950 | 12/1935 | Carter | 119/29 |
| 2,703,344 | 3/1955 | Anderson | 179/107 |
| 2,741,224 | 4/1956 | Putnaiy | 119/29 |
| 2,800,104 | 7/1957 | Cameron et al. | 119/29 |
| 2,996,043 | 8/1961 | Pettingill | 119/29 |
| 3,310,754 | 3/1967 | Stewart | 331/112 |

OTHER REFERENCES

OUTDOOR LIFE PUBLICATION, Oct. 1964 Excerpts from Selected Advertisments copy in 119— 29

*Primary Examiner*— Aldrich F. Medbery
*Attorney*— Donald Gunn

ABSTRACT: For use in training an animal with equipment including a transmitter and a receiver attached to a collar or harness on the animal, the improvement which incorporates a receiver circuit communicated with a suitable amplifier for transmitted signals and a suitable voltage which provides a slight shock to the animal as an aid in training, the voltage being adjustable to reduce or increase the amount of shock applied to the animal.

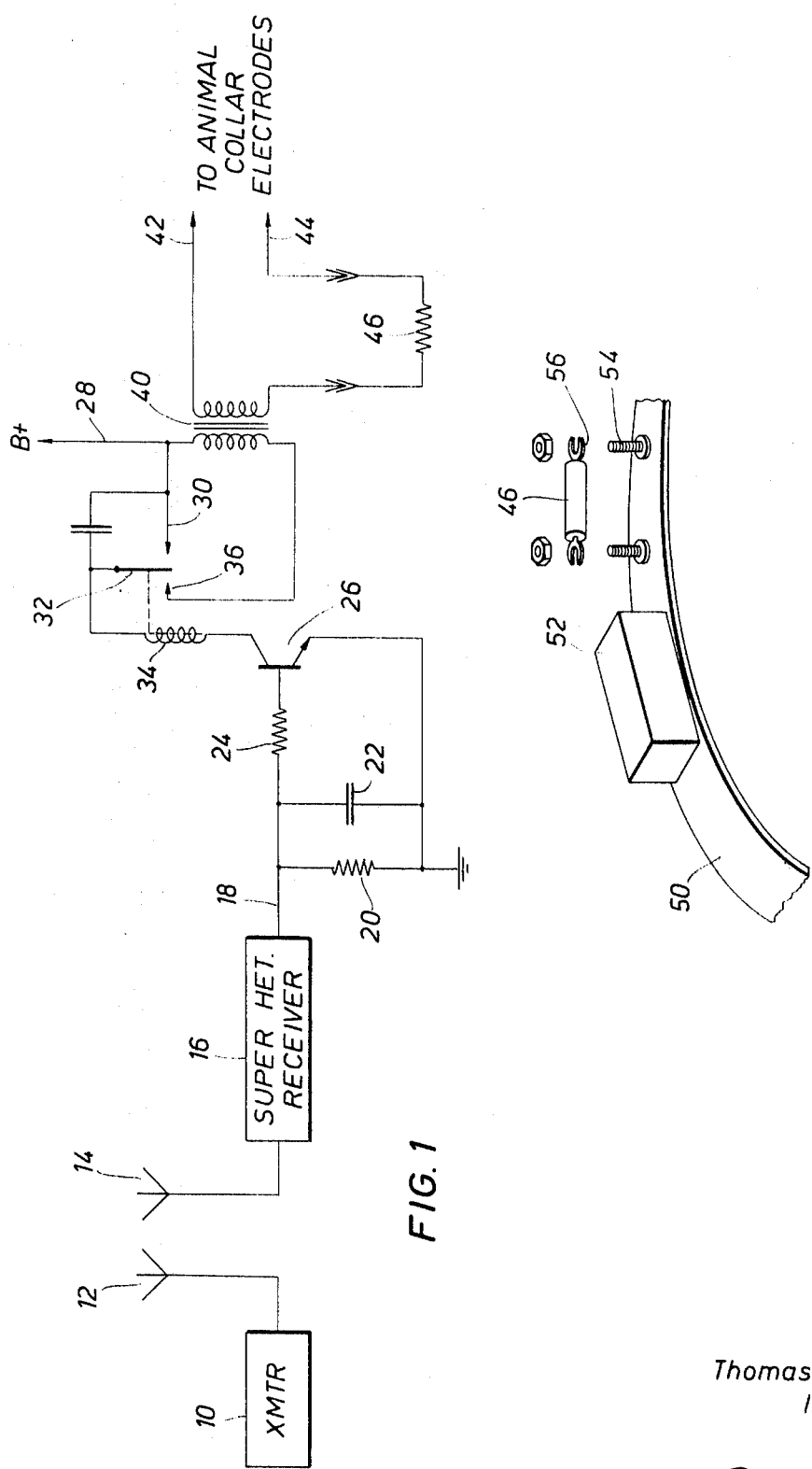

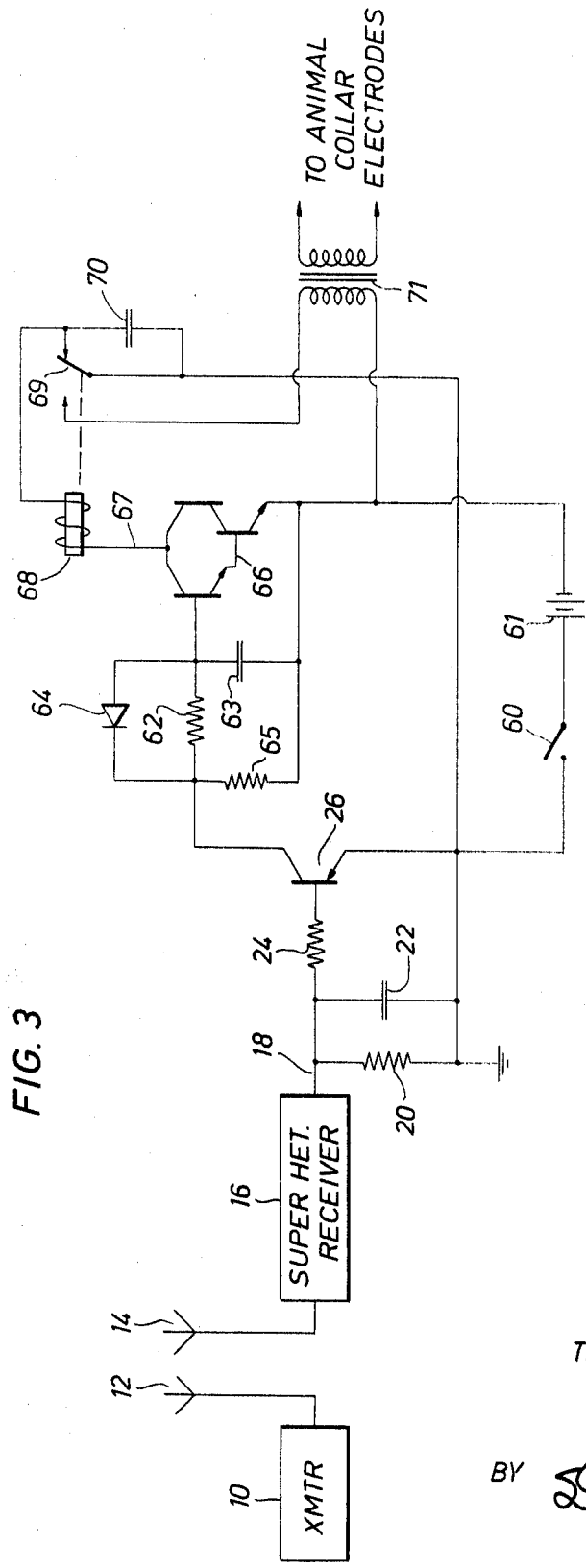

RADIO CONTROLLED ANIMAL TRAINING DEVICE

SUMMARY OF PROBLEM AND SOLUTION

In the training of animals, it has become commonplace to utilize small transistorized transmitters and receivers to communicate certain signals to the animal. Thus, when the animal is misbehaving, or is too far away, or is to perform in a timed sequence, a certain signal is transmitted to the animal to create an electrical shock for the animal of sufficient magnitude to be felt and sensed, but, of course, sufficiently small to be not harmful. The training equipment typically engenders the use of a transistorized receiver and small battery supply on the animal, normally attached to the collar or harness. Inasmuch as the terminal voltage of batteries decreases over a period of time and the consequential shock is likewise decreased, the present invention is supplied as a means for compensating for the decreasing battery voltage and for other reasons. Moreover, the apparatus may be shifted from a highly sensitive animal to an insensitive animal which requires greater electrical shock. In this case, the apparatus is readily moved from the first to the second animal, and the present invention provides a means whereby the adjustment is easily accomodated. The present invention is summarized as incorporating a collar or harness which is a support structure for a suitable transistorized receiver, typically a superheterdyne receiver. The receiver forms an output signal which cooperates, typically with a battery supply, to form an AC voltage which is stepped up to a suitable level to provide the shock to the animal. A dropping resistor in the output circuit controls the amount of shock applied to the animal.

Many objects and advantages of the present invention will become more readily apparent from a reading of the specification in conjunction with the drawings, wherein:

FIG. 1 is a schematic wiring diagram of the present invention, the receiver portion and associated circuitry being adapted to be mounted in a small watertight enclosure or container and attached to a collar or harness on the animal;

FIG. 2 is a perspective view of the receiver attached to the collar and showing one means of adjusting the shock level; and, FIG. 3 is a schematic wiring diagram of an alternative embodiment of the present invention, the additional circuitry incorporating circuit means prevent spurious signals from causing false indications.

Attention is first directed to the drawing which includes a transmitter indicated by the numeral 10. The transmitter 10 is a conventional tone transmitter which can be modulated at any suitable signal, typically at an audio frequency. The transmitter will typically include a loud speaker which monitors its own audio modulating signal to provide an indication to the animal trainer that a signal is being transmitted. The transmitter 10 is tuned to a suitable frequency and may be crystal controlled if desired. Of course, a variable frequency oscillator may also be incorporated in the transmitter. The output of the transmitter is typically in the milliwatt range which is quite adequate for providing signals up to perhaps one mile or so. Typically, the transmitter frequency is in the order of 27 megahertz in compliance with the rules of the FCC for licensing of the apparatus. Of course, the several broad descriptive statements concerning the transmitter 10 are supplied by way of example and not limitation, it being understood that the nature of the transmitter is generally of no particular consequence to the present invention.

The transmitter 10 incorporates an antenna 12 of suitable construction which is communicated with an antenna 14 on the animal. Typically, the antenna 14 is found in the collar or harness on the animal. Inasmuch as the collar or harness can vary in detail, depending on the size of the animal and number of strap members comprising the collar or harness, it is believed unnecessary to the present disclosure to fully illustrate the precise details of a collar or harness. As shown in FIG. 2, the present apparatus is mounted on a collar or harness in a watertight enclosure, typically constructed of a protective material and which will routinely comprise a structure no more than ten or twelve ounces, including battery, to avoid being unduly burdensome on the animal. It is typically attached to a leather or rubberlike material which is used in the manufacture of the collar.

The antenna 14 communicates with a superheterdyne receiver 16. The receiver is tuned to the frequency of the transmitter and has a relatively narrow band to receive the signals from the transmitter 10. The receiver 16 is of conventional construction and typically includes an RF amplifier, an IF strip, demodulator, and an audio amplifier. The output of the superheterdyne receiver 16 is communicated by a conductor 18 to a resistor 20 and parallel capacitor 22. The capacitor 22 is of measurable capacitance, perhaps on the order of one hundred microfarad. A small dropping resistor 24 prevents parasitic signals from feeding to the remainder of the circuit.

When the transmitter 10 is operated, a signal is formed on the conductor 18. The capacitor 22 charges to a suitable level and in effect provides a DC operating level for a transistor 26. Small signals, such as those derived from noise and the like, are suitably suppressed by the resistor 24. Once the capacitor 22 is charged by the signal on the conductor 18, a discharge route is provided by a relatively small resistance at the resistor 20. This prevents prolonging the shock signal to the animal after the operation of the transmitter 10 is terminated.

The numeral 28 indicates a connection to a suitable B+ supply which is a portion of the collector circuitry of the transistor 26. The number 30 indicates a terminal of a relay which is normally contacted against the armature 32. The collector is connected to the coil of the relay 34 which provides a path to the B+ supply. When current flows through the coil 34, the armature 32 is contacted against a second contact 36. The contact 36 provides connection through the primary of a transformer 40 when the relay is operated. In the quiescent condition with no signal from the transmitter 10, the collector circuit includes the B+ supply 28, the contact 30, the armature 32, and the relay coil 34. However, the absence of a driving signal at the base 26 interrupts current flow through the transistor, and hence, there is no drain on the B+ supply in the quiescent condition.

The transformer 40 includes a secondary which is connected to a pair of output terminals which are indicated by the numerals 42 and 44. The terminals 42 and 44 are preferably metal terminals carried on the inside of the collar or harness and adapted to be contacted against the animal. It will be appreciated that they typically bear against the fur of the animal, and hence, some reduction in the shock received by the animal is provided by the pelt. Nevertheless, the terminals provide sufficient contact with the animal to provide the shock which obtains the desired response of the animal when training. The numeral 46 indicates a dropping resistor in series with the animal contacts 42 and 44 which reduces the voltage or shock sensed by the animal.

Attention is directed to FIG. 2 which shows a portion of the collar indicated by the numeral 50, and a suitable container 52 which houses the receiver, battery, and associated apparatus. The numeral 54 indicates a pair of plug-connective terminals for receiving the spade terminals 56 on the resistor 46. Thus, the resistor 46 is connected into the circuitry contained within the housing 52 to easily substitute the resistive value in the circuitry.

In operation, the absence of a transmitted signal detected by the receiver is indicated by the absence of a positive voltage at the base of the NPN transistor 26. In this event, no current flows through the transistor even though the collector is provided with a connection to the B+ source. In the event that current should flow in the base circuitry and accumulate a charge on the capacitor 22, the transistor is made conductive. Current flow in the collector circuitry energizes the relay coil. This causes the armature 32 to swing to the other contact, breaking the completed collector circuit. When the circuit in the collector is interrupted by the movement of the relay, the current flow through the coil of the relay collapses and the armature swings back to the original contact 30. This creates a chatter in the relay and causes a pulsating current flow in the circuit. The pulsating current flow has the form of an AC voltage which is applied to the primary of the transformer 40. Application of an AC voltage to the primary of the transformer 40 results in an induced AC voltage in the secondary. The current flow shocks the animal, it being noted that the resistor 46 provides a controllable drop which prevents the application of excessive shock to the animal. It is of no particular consequence that the AC applied to the primary of the transformer 40 is really a pulsating DC level, or has overshoot, or is otherwise irregular in wave form inasmuch as the apparatus functions to shock the animal without regard to the wave form.

The resistor 46 may be increased or decreased in value depending on the animal to be trained, his temperament and obstinance, the amount of fur or hair on the neck of the animal, and other factors. Also, battery aging is of some consequence in the use of the present invention. In view of all these circumstance, it will be appreciated that the resistor is varied over quite a wide range to reduce or increase the amount of shock sensed by the animal.

While the foregoing is directed to the preferred version of the structure of FIG. 1, a number of changes may be implemented in it. For instance, the circuitry shows an NPN transistor, but it will be understood that a PNP transistor may be readily adapted while observing the required polarities in its connection.

Attention is next directed to FIG. 3 of the drawings. FIG. 3 illustrates an improved version over that of FIG. 1 in that circuit means have been included which prevent false triggering on spurious signals. For instance, the apparatus of the present animal trainer may be operated in the vicinity of a voice modulated transmitter. This is one source of spurious signals which is considered highly undesirable. Quite often, improper modulation of the voice transmitter in the vicinity will create signals of broad frequency coverage which might cause unwanted shock to the animal. This, of course, disrupts the training technique of the user of the present apparatus. Consequently, the circuitry of FIG. 3 has been modified so that it responds only to a transmitted signal of sufficient duration. This will be described in detail hereinafter.

FIG. 3 remains the same up to the connection of the transistor 26. The transistor 26 is connected with a switch 60 and suitable collector voltage source 61. The collector of the transistor 26 includes a series resistor 62 and capacitor 63. A diode 64 discharges the capacitor 63 through small resistor 65 connected across the resistor 62 and capacitor 63. When the transistor 26 is conductive, the diode 64 is blocked because it is essentially connected to the positive terminal of the source.

The numeral 66 indicates a high input impedance transistor such as a Darlington amplifier. It is an integrated circuit which is, in effect, a pair of emitter followers so that the input impedance is roughly given by the multiple of the Beta of the first transistor times the Beta of the second transistor times the emitter resistance of the second transistor. If desired, a single transistor such as a field effect transistor characterized by its conventional high input impedance may be used in lieu of the Darlington amplifier shown in FIG. 3. In any event, the conductor 67 communicates with a relay 68 having a set of contacts at 69 which serve the same purpose as the contacts 32 previously described. A capacitor 70 connected across the contracts 69 accumulates a charge which is discharged through the closure of the contacts and into the transformer 71. The transformer 71 is connected to the animal collar electrodes as shown in FIG. 2.

In operation, the circuitry of FIG. 3 operates in the same manner up to the transistor 26. When the transistor 26 amplifies a spurious signal, conduction of the transistor 26 tends to turn on the transistor 66. However, its turn on is impeded by the charging time of the capacitor 63. In effect, the time constant of the resistor 62 and the capacitor 63 determines the amount of signal supression of the spurious signal. If it requires as much as one second to charge to an adequate level and turn the transistor 66 on, then spurious signals of a shorter length are suppressed. This, then, means that the relay 68 is not operated and the animal is not shocked. On the other hand, when the transmitter 10 is operated in the desired manner, the signal is simply prolonged sufficiently to charge the capacitor 63 of FIG. 3 to a level to turn on the transistor 66 and thereby cause current flow through the armature of the relay 68. This trips the relay to form a pulse of current flowing in the primary of the transformer 71 and forming the shock for the animal in the manner described hereinbefore.

The means described with regard to FIG. 3 may be best noted as spurious signal suppressing means. This has been found particularly helpful depending on the nature and kind of transmitters in and about the vicinity where the apparatus is used.

The terminology adapted herein is applied to the claims appended hereto.

What I claim is:

1. Animal training apparatus for use with a transmitter comprising:
    a. a superheterdyne receiver adapted to be tuned to the frequency of such a transmitter;
    b. collar means for mounting said receiver on an animal to be trained;
    c. a voltage source;
    d. electrodes mounted on said collar and adapted to be placed in contact with the animal, said electrodes being connected in an incomplete circuit with said voltage source;
    e. connective means operably controlled by the output of said receiver and rendered operative on receipt of a signal received thereby, said connective means completing said incomplete circuit to provide a current flow to said electrodes from said voltage source to form a shock for the animal being trained;
    f. a series dropping resistor externally mounted on said collar and exposed for hand manipulation such that said resistor can be selectively altered in value remote from said receiver;
    g. a pair of releasably connectable connective terminals for said resistor connected in said incomplete circuit, said terminals being supported by said collar,
    h. a voltage chopper connected to said voltage source;
    i. a transformer connected to said voltage chopper; and
    j. said terminals being connected to the secondary of said transformer with said resistor being in series with said terminals.

2. The invention of claim 1 wherein said terminals include a pair of threaded mounting posts which cooperatively receive thereon threaded mechanical connectors which secure said resistor at a specified position.

3. The invention of claim 2 wherein said resistor has a pair of protruding clamps which releasably engage said posts.

4. The invention of claim 1 wherein said receiver is placed in a housing remote from said resistor and carried on said collar.

5. Animal training apparatus for use with a transmitter, comprising:
    a. a superheterdyne receiver adapted to be tuned to the frequency of such a transmitter;
    b. collar means for mounting said receiver on an animal to be trained;
    c. a voltage source;
    d. electrodes mounted on said collar and adapted to be placed in contact with the animal, said electrodes being connected in an incomplete circuit with said voltage source;
    e. connective means operably controlled by the output of said receiver and rendered operative on receipt of a signal received thereby, said connective means completing said incomplete circuit to provide a current flow to said electrodes from said voltage source to form a shock for the animal being trained; and f. there being interposed between said terminals and the output of said receiver a time delay circuit rendered operative only after receipt of a signal from the transmitter by said receiver after a finite period of time, said time delay circuit including a charging capacitor which must be charged to a predetermined level to permit operation of said complete circuit, said charging capacitor controllably gating a transistorized switch means connected to control operation of a relay.